US011794095B2

(12) United States Patent
Nishikawa et al.

(10) Patent No.: US 11,794,095 B2
(45) Date of Patent: Oct. 24, 2023

(54) INFORMATION PROCESSING APPARATUS AND DEVICE INFORMATION DERIVATION METHOD

(71) Applicant: Sony Interactive Entertainment Inc., Tokyo (JP)

(72) Inventors: Kenzo Nishikawa, Tokyo (JP); Takanori Minamino, Kanagawa (JP)

(73) Assignee: Sony Interactive Entertainment Inc., Tokyo (JP)

(*) Notice: Subject to any disclaimer, the term of this patent is extended or adjusted under 35 U.S.C. 154(b) by 53 days.

(21) Appl. No.: 17/440,869

(22) PCT Filed: Apr. 17, 2020

(86) PCT No.: PCT/JP2020/016854
§ 371 (c)(1),
(2) Date: Sep. 20, 2021

(87) PCT Pub. No.: WO2020/218182
PCT Pub. Date: Oct. 29, 2020

(65) Prior Publication Data
US 2022/0161127 A1    May 26, 2022

(30) Foreign Application Priority Data
Apr. 24, 2019   (JP) .................. 2019-083059

(51) Int. Cl.
*G09G 5/00*    (2006.01)
*A63F 13/213*    (2014.01)
(Continued)

(52) U.S. Cl.
CPC .......... *A63F 13/213* (2014.09); *A63F 13/428* (2014.09); *G02B 27/0172* (2013.01); *G06F 3/0346* (2013.01)

(58) Field of Classification Search
CPC ................. A63F 13/213; A63F 13/428; G02B 2027/0138; G02B 27/0093; G02B 27/0172; G06F 3/017; G06F 3/0304; G06F 3/0346
See application file for complete search history.

(56) References Cited

U.S. PATENT DOCUMENTS 8,350,805 B2    1/2013 Miyazaki
8,747,224 B2    6/2014 Miyazaki et al.
(Continued)

FOREIGN PATENT DOCUMENTS

EP    2006002 A1    12/2008
JP    5714108 U    1/1982
(Continued)

OTHER PUBLICATIONS

Extended European Search Report for related EP Application No. 20787365.4, 10 pages, dated Dec. 6, 2022.
(Continued)

*Primary Examiner* — Insa Sadio
(74) *Attorney, Agent, or Firm* — Matthew B. Dernier, Esq.

(57) ABSTRACT

A captured image acquisition unit acquires an image obtained by capturing a first device that includes a plurality of markers and a second device that includes a plurality of markers. An estimation processing unit first derives position information and posture information of the first device on the basis of marker image coordinates in the captured image and then derives position information and posture information of the second device on the basis of remaining maker image coordinates excluding marker image coordinates of the first device.

6 Claims, 10 Drawing Sheets

(51) Int. Cl.
*A63F 13/428* (2014.01)
*G02B 27/01* (2006.01)
*G06F 3/0346* (2013.01)

(56) References Cited

U.S. PATENT DOCUMENTS

| | | | |
|---|---|---|---|
| 8,947,494 | B2 | 2/2015 | Abe |
| 9,649,558 | B2 | 5/2017 | Stafford |
| 9,746,921 | B2 | 8/2017 | Mallinson |
| 9,884,248 | B2 | 2/2018 | Koseki |
| 10,275,097 | B2 | 4/2019 | Tanaka |
| 11,036,053 | B2 | 6/2021 | Isayama |
| 2007/0218994 | A1 | 9/2007 | Goto |
| 2009/0174657 | A1 | 7/2009 | Miyazaki |
| 2011/0183751 | A1 | 7/2011 | Ueshima |
| 2011/0263329 | A1 | 10/2011 | Miyazaki |
| 2013/0106986 | A1 | 5/2013 | Abe |
| 2013/0281213 | A1 | 10/2013 | Yasuda |
| 2015/0170549 | A1 | 6/2015 | Kasahara |
| 2015/0258431 | A1 | 9/2015 | Stafford |
| 2015/0352437 | A1 | 12/2015 | Koseki |
| 2018/0074654 | A1 | 3/2018 | Tanaka |
| 2018/0150971 | A1* | 5/2018 | Adachi ............ G06T 7/73 |
| 2019/0096068 | A1 | 3/2019 | Fontanel |
| 2019/0102613 | A1* | 4/2019 | Watanabe ........ G06T 7/11 |
| 2020/0225490 | A1 | 7/2020 | Isayama |

FOREIGN PATENT DOCUMENTS

| | | | |
|---|---|---|---|
| JP | 4133204 | U | 12/1992 |
| JP | 348822 | | 9/1994 |
| JP | 2005135425 | A | 5/2005 |
| JP | 2007296248 | A | 11/2007 |
| JP | 2015232783 | A | 12/2015 |
| JP | 2017101961 | A | 6/2017 |
| JP | 2017516185 | A | 6/2017 |
| JP | 2018032102 | A | 3/2018 |
| JP | 2019061528 | A1 | 4/2019 |
| WO | 2007116578 | A1 | 10/2007 |
| WO | 2007129432 | A1 | 11/2007 |
| WO | 2009093461 | A1 | 7/2009 |
| WO | 2010055737 | A1 | 5/2010 |
| WO | 2011145180 | A1 | 11/2011 |
| WO | 2015079715 | A1 | 6/2015 |
| WO | 2016157807 | A1 | 10/2016 |
| WO | 2019021601 | A1 | 1/2019 |

OTHER PUBLICATIONS

International Search Report for corresponding PCT Application No. PCT/JP2020/016854, 4 pages, dated Jul. 7, 2020.
International Search Report for related PCT Application No. PCT/JP2020/013746, 4 pages, dated Jun. 9, 2020.
International Search Report for related PCT Application No. PCT/JP2020/013747, 4 pages, dated Jun. 16, 2020.
Decision to Grant a Patent for related JP Application No. 2019-075855, 5 pages, dated Apr. 28, 2023.
Notice of Reasons for Refusal for related JP Application No. 2019-077220, 6 pages, dated Apr. 12, 2023.

* cited by examiner

14

INFORMATION PROCESSING APPARATUS AND DEVICE INFORMATION DERIVATION METHOD

TECHNICAL FIELD

The present invention relates to a technology for deriving position information and posture information of a device.

BACKGROUND ART

PTL 1 discloses a game apparatus that acquires a frame image obtained by imaging the front of the game apparatus, estimates position information and posture information of a game controller in an actual space based on a position of a light emitting diode (LED) image of the game controller in the frame image, and reflects the estimated position information and/or posture information on processing of a game application.

CITATION LIST

Patent Literature

[PTL 1]
Japanese Patent Laid-Open No. 2007-296248

SUMMARY

Technical Problem

In recent years, an information processing technology of tracking a position or a posture of a device and reflecting the position or the posture on a three-dimensional (3D) model in a virtual reality (VR) space is widespread. An information processing apparatus operatively associates a movement of a player character or a game object in a game space with a change in position and posture of a device that is a tracking target to realize an intuitive operation by a user.

In order to estimate the position and the posture of the device, a plurality of light emitting markers are attached to the device. The information processing apparatus specifies coordinates of a plurality of marker images included in an image obtained by imaging the device and compares the specified coordinates with three-dimensional coordinates of a plurality of markers in a three-dimensional model of the device to estimate the position and the posture of the device in the actual space. Where a captured image includes marker images of a plurality of devices, the number of marker images in the captured image increases according to the number of devices, thereby increasing an amount of calculation in an estimation process.

Therefore, it is an object of the present invention to provide a technology for decreasing the amount of calculation necessary for estimation operation of positions and postures of a plurality of devices. It is to be noted that, while the devices may be inputting devices each having an operation button, they may otherwise be devices that do not have any operation member and are mere targets of tracking.

Solution to Problem

In order to solve the above problem, according to an aspect of the present invention, there is provided an information processing apparatus including a captured image acquisition unit configured to acquire an image obtained by capturing a first device that includes a plurality of markers and a second device that includes a plurality of markers, and an estimation processing unit configured to estimate position information and posture information of the first device and position information and posture information of the second device on the basis of marker image coordinates in the captured image. The estimation processing unit first derives the position information and the posture information of the first device and then derives the position information and the posture information of the second device on the basis of remaining marker image coordinates excluding marker image coordinates of the first device.

According to another aspect of the present invention, there is provided a device information derivation method including a step of acquiring an image obtained by capturing a first device that includes a plurality of markers and a second device that includes a plurality of markers, a step of deriving position information and posture information of the first device on the basis of marker image coordinates in the captured image, and a step of deriving position information and posture information of the second device on the basis of remaining marker image coordinates excluding marker image coordinates of the first device.

DESCRIPTION OF EMBODIMENT

Figure 1:
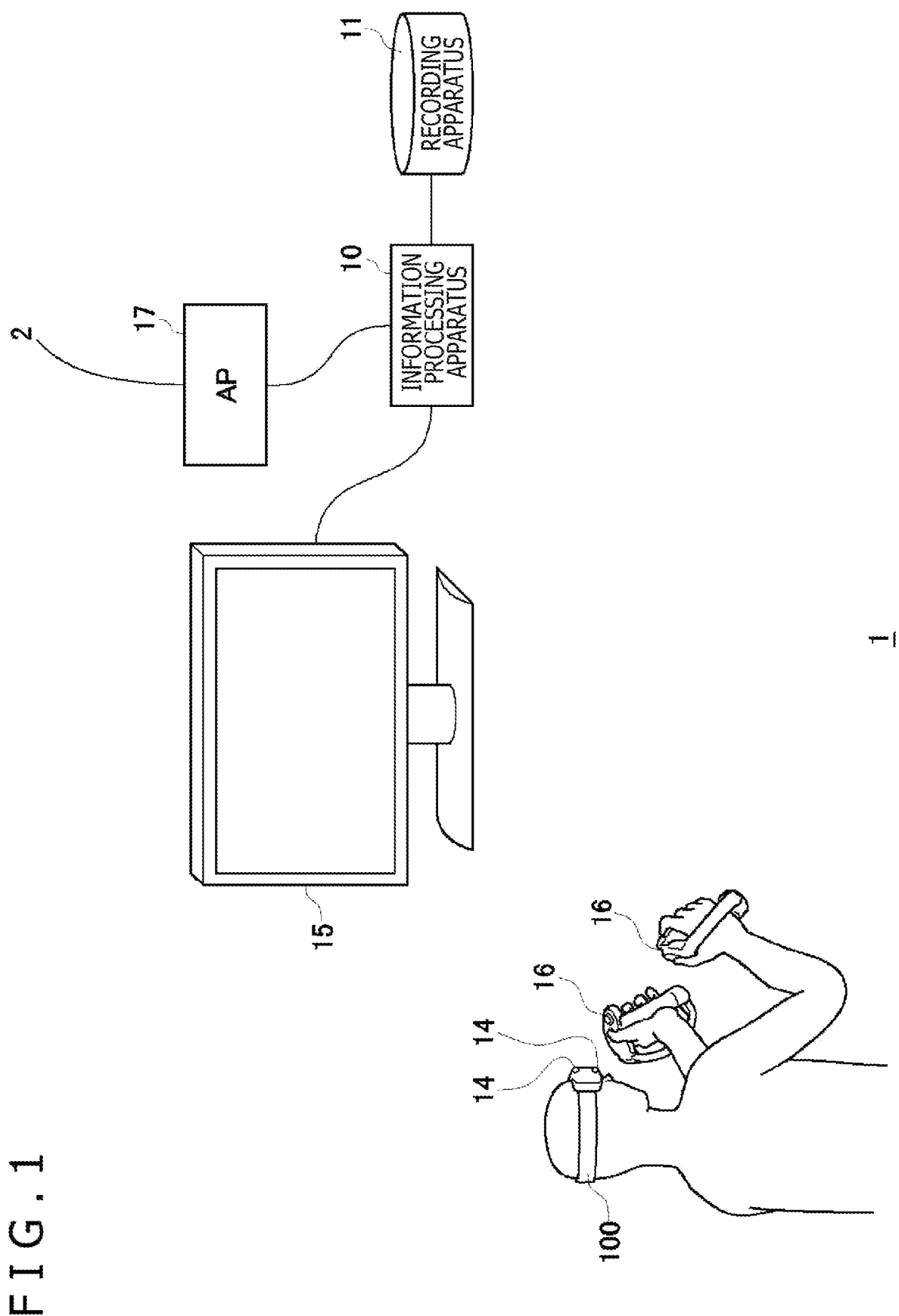
FIG. 1 is a view depicting a configuration example of an information processing system according to an embodiment.

FIG. 1 depicts a configuration example of an information processing system 1 according to an embodiment. The information processing system 1 includes an information processing apparatus 10, a recording apparatus 11, an HMD 100, inputting devices 16 for being operated by a user with fingers of his/her hands, and an outputting apparatus 15 that outputs images and sound. The outputting apparatus 15 may be a television set. The information processing apparatus 10 is connected to an external network 2 such as the Internet through an access point (AP) 17. The AP 17 has functions of a wireless access point and a router. The information processing apparatus 10 may be connected to the AP 17 by a cable or by a known wireless communication protocol.

The recording apparatus 11 records applications of system software, game software, and the like. The information processing apparatus 10 may download game software from a content server into the recording apparatus 11 through the network 2. The information processing apparatus 10 executes the game software and supplies image data and sound data of the game to the HMD 100. The information processing apparatus 10 and the HMD 100 may be connected to each other by a known wireless communication protocol or by a cable.

The HMD 100 is a display apparatus that displays images on a display panel positioned in front of the eyes of the user when the user wears the HMD 100 on the head. The HMD 100 displays an image for the left eye on a display panel for the left eye and displays an image for the right eye on a display panel for the right eye separately from each other. The images configure parallax images viewed from left and right viewpoints to implement a stereoscopic vision. Since the user views the display panels through optical lenses, the information processing apparatus 10 corrects optical distortion of parallax image data due to the lenses and then supplies the parallax image data to the HMD 100.

Although the outputting apparatus 15 is not necessary for the user who wears the HMD 100, by preparing the outputting apparatus 15, another user can view a display image on the outputting apparatus 15. Although the information processing apparatus 10 may cause the outputting apparatus 15 to display an image same as the image being viewed by the user who wears the HMD 100, it may cause the outputting apparatus 15 to display another image. For example, in such a case that the user wearing the HMD 100 and another user play a game together, the outputting apparatus 15 may display a game image from a character viewpoint of the other user.

The information processing apparatus 10 and each of the inputting devices 16 may be connected to each other by a known wireless communication protocol or by a cable. The inputting devices 16 each include a plurality of operation members such as operation buttons, and the user operates the operation members with its fingers while gripping the inputting devices 16. When the information processing apparatus 10 executes a game, the inputting devices 16 are used as game controllers. The inputting devices 16 each include a posture sensor including a three-axis acceleration sensor and a three-axis gyro sensor and transmits sensor data in a predetermined cycle (1600 Hz, for example) to the information processing apparatus 10.

The game in the embodiment uses not only operation information of the operation members of the inputting devices 16 but also a position, a posture, a movement, and so forth of each the inputting devices 16 as operation information and reflects the operation information on a movement of a player character in a virtual three-dimensional space. For example, the operation information of the operation members may be used as information for moving the player character, and the operation information of the position, the posture, the movement, and so forth of each of the inputting devices 16 may be used as information for moving an arm of the player character. In a battle scene in the game, movements of the inputting devices 16 are reflected on the movement of a player character having a weapon, so that an intuitive operation by the user is realized and the immersion in the game is increased.

In order to track the position and the posture of each inputting device 16, a plurality of markers (light emitting parts) are provided on the inputting device 16 such that they can be captured by imaging devices 14 mounted on the HMD 100. The information processing apparatus 10 analyzes images obtained by capturing the inputting device 16 to estimate position information and posture information of the inputting device 16 in the actual space. The information processing apparatus 10 then provides the estimated position information and posture information to the game.

The HMD 100 has a plurality of imaging devices 14 mounted thereon. The plurality of imaging devices 14 are attached in different postures at different positions of a front face of the HMD 100 such that a totaling imaging range of imaging ranges of them includes an overall field of view of the user. It is sufficient if the imaging devices 14 are image sensors that can acquire images of the plurality of markers of the inputting device 16. For example, in a case where the markers emit visible light, the imaging devices 14 include visible light sensors that are used in a general digital video camera, such as a charge coupled device (CCD) sensor or a complementary metal oxide semiconductor (CMOS) sensor. In a case where the markers emit invisible light, the imaging devices 14 include invisible light sensors. The plurality of imaging devices 14 image the front of the user in a predetermined cycle (60 frames per second, for example) at synchronized timings and transmit captured image data of the inputting device 16 to the information processing apparatus 10.

The information processing apparatus 10 specifies positions of the images of the plurality of markers of each inputting device 16 included in the captured images. It is to be noted that, although a single inputting device 16 is sometimes imaged at a same timing by the plurality of imaging devices 14, since an attachment position and an attachment posture of each imaging device 14 are known, the information processing apparatus 10 merges the plurality of captured images to specify the position of each marker image.

A three-dimensional shape of each inputting device 16 and position coordinates of the plurality of markers arranged on a surface of the inputting device 16 are known, and the information processing apparatus 10 estimates the position coordinate and the posture of the inputting device 16 on the basis of a distribution of the marker images in the captured image. The position coordinate of the inputting device 16 may be a position coordinate in a three-dimensional space having an origin at a reference position. The reference position may be a position coordinate (a latitude and a longitude) set before the game is started.

It is to be noted that the information processing apparatus 10 can estimate the position coordinate and the posture of the inputting device 16 also by using sensor data detected by the posture sensor of the inputting device 16. Therefore, the information processing apparatus 10 of the present embodiment may perform a process of tracking the inputting device 16 with high accuracy by using an estimation result based on the captured images captured by the imaging devices 14 and an estimation result based on the sensor data.

Figure 2:
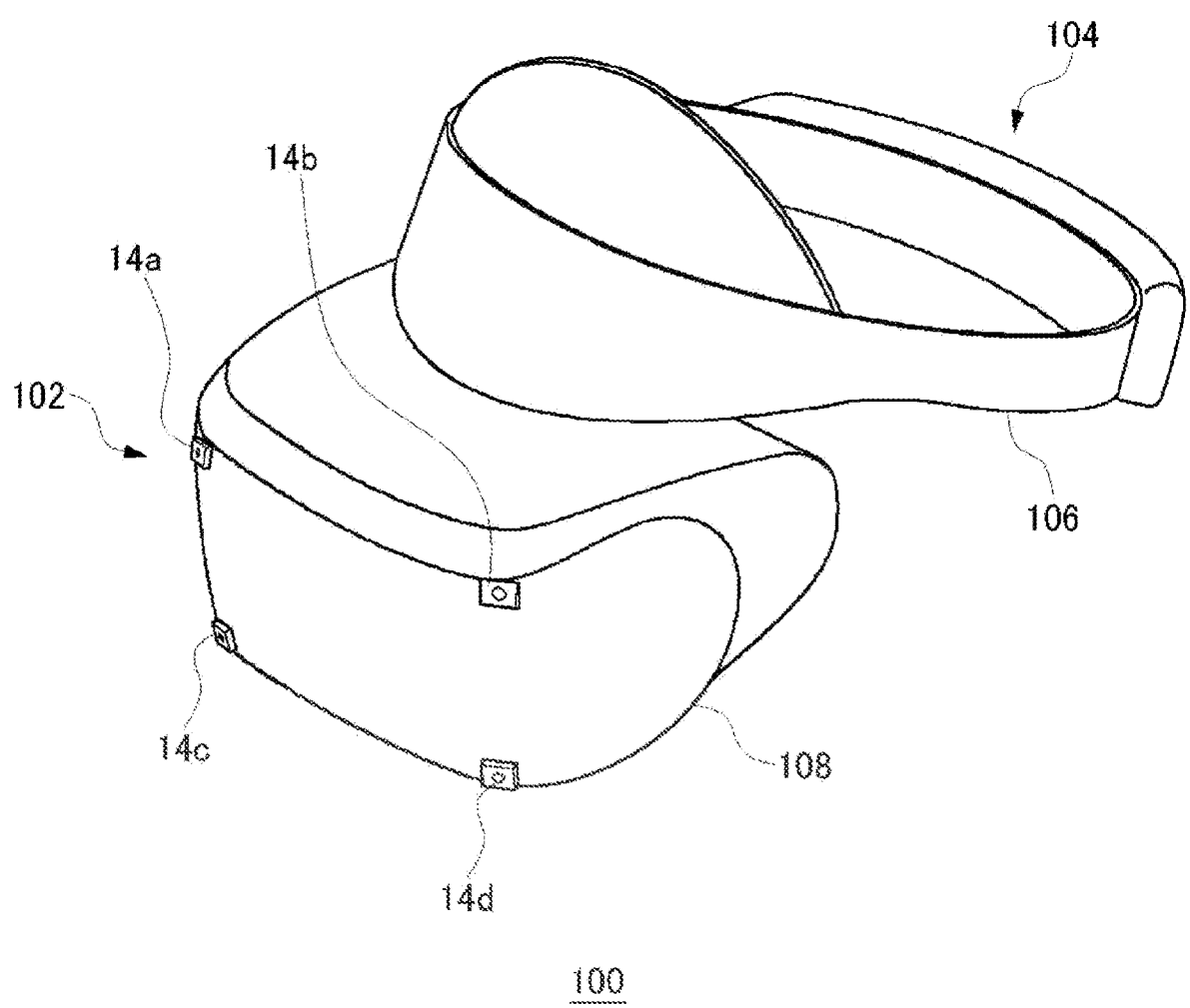
FIG. 2 is a view depicting an example of an appearance shape of a head-mounted display (HMD).

FIG. 2 depicts an example of an appearance shape of the HMD 100. The HMD 100 includes an outputting mechanism unit 102 and a mounting mechanism unit 104. The mounting mechanism unit 104 includes a mounting band 106 that extends, when the HMD 100 is worn by the user, around the head of the user to fix the HMD 100 to the head. The mounting band 106 has a material or a structure that allows adjustment of the length thereof according to the circumference of the head of the user.

The outputting mechanism unit 102 includes a housing 108 having such a shape as to cover the left and right eyes in the state in which the user wears the HMD 100 and includes, inside the housing 108, a display panel that confronts the eyes when the user wears the HMD 100. The display panel may be a liquid crystal panel, an organic electroluminescence (EL) panel, or a like panel. Inside the housing 108, a pair of left and right optical lenses are further provided such that they are positioned between the display panel and the eyes of the user and enlarge a viewing angle of the user. The HMD 100 may further include speakers or earphones at positions corresponding to the ears of the user, or external headphones may be connected to the HMD 100.

A plurality of imaging devices 14a, 14b, 14c, and 14d are provided on a front side outer face of the housing 108. With reference to a gaze direction of the user, the imaging device 14a is attached to an upper right corner of the front side outer face of the housing 108 such that its camera optical axis points right upward; the imaging device 14b is attached to an upper left corner of the front side outer face of the housing 108 such that its camera optical axis points left upward; the imaging device 14c is attached to a lower right corner of the front side outer face of the housing 108 such that its camera optical axis points right downward; and the imaging device 14d is attached to a lower left corner of the front side outer face of the housing 108 such that its camera optical axis points left downward. Since the plurality of imaging devices 14 are installed in this manner, the totaling imaging range of the imaging ranges of them includes the overall field of view of the user. The field of view of the user may be a field of view of the user in the three-dimensional virtual space.

The HMD 100 transmits sensor data detected by a posture sensor and image data captured by the imaging devices 14 to the information processing apparatus 10 and receives game image data and game sound data generated by the information processing apparatus 10.

Figure 3:
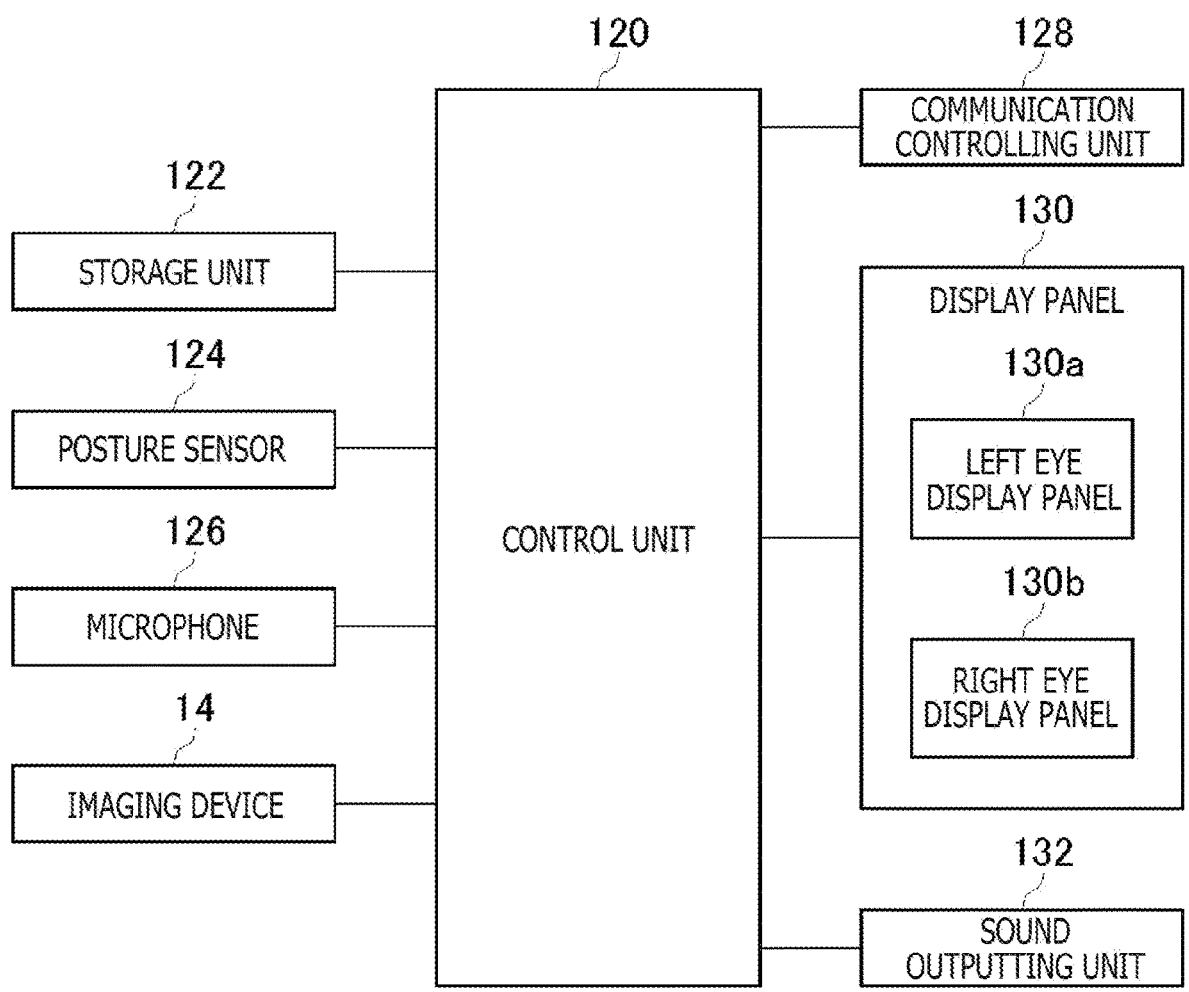
FIG. 3 is a view depicting functional blocks of the HMD.

FIG. 3 depicts functional blocks of the HMD 100. A control unit 120 is a main processor that processes and outputs various kinds of data such as image data, sound data, and sensor data and commands. A storage unit 122 temporarily stores data and commands to be processed by the control unit 120. A posture sensor 124 acquires sensor data relating to a movement of the HMD 100. The posture sensor 124 includes at least a three-axis acceleration sensor and a three-axis gyro sensor. The posture sensor 124 detects values (sensor data) of individual axial components in a predetermined cycle (1600 Hz, for example).

A communication controlling unit 128 transmits data outputted from the control unit 120 to the external information processing apparatus 10 by wired or wireless communication through a network adapter or an antenna. Further, the communication controlling unit 128 receives data from the information processing apparatus 10 and outputs the data to the control unit 120.

Upon receiving game image data and game sound data from the information processing apparatus 10, the control unit 120 supplies the game image data to a display panel 130 so as to be displayed on the display panel 130 and supplies the sound image data to a sound outputting unit 132 so as to be outputted as sound from the sound outputting unit 132. The display panel 130 includes a left eye display panel 130a and a right eye display panel 130b such that a pair of parallax images are displayed on the display panels. Further, the control unit 120 controls the communication controlling unit 128 to transmit sensor data from the posture sensor 124, sound data from a microphone 126, and captured image data from the imaging devices 14 to the information processing apparatus 10.

Figure 4:
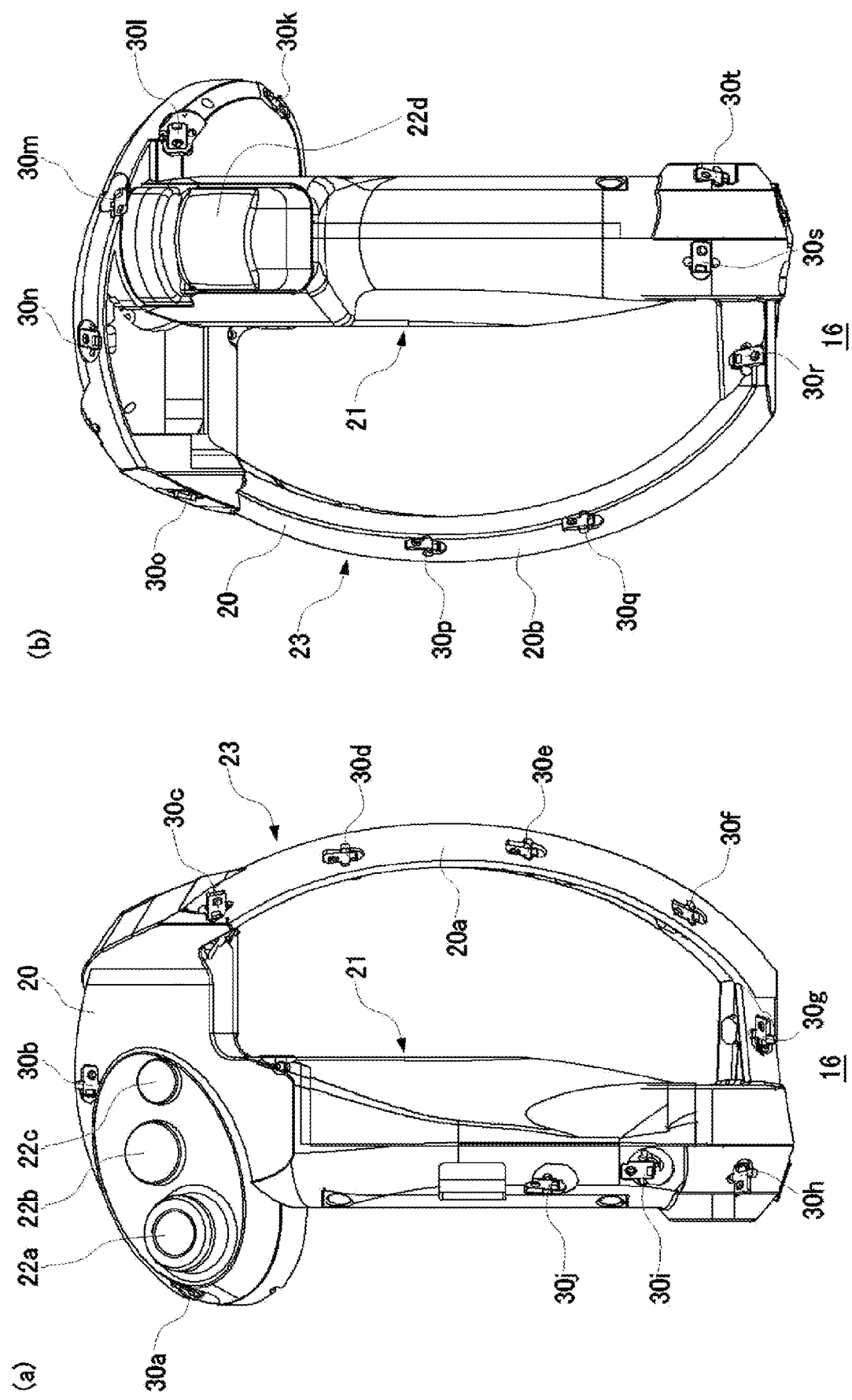
FIG. 4 is a view depicting an appearance shape of an inputting device.

FIG. 4 depicts an appearance shape of the inputting device 16. FIG. 4(a) depicts a front shape of the inputting device 16 and FIG. 4(b) depicts a rear shape of the inputting device 16. The inputting device 16 includes a case body 20, a plurality of operation members 22a, 22b, 22c, and 22d (hereinafter, in the case where the operation members 22a, 22b, 22c, and 22d are not specifically distinguished from each other, each of them is hereinafter referred to as an "operation member 22") for being operated by the user, and a plurality of markers 30a to 30t (hereinafter, in the case where the markers 30a to 30t are not specifically distinguished from each other, each of them is referred to as a "marker 30") that emit light to the outside of the case body 20. The operation members 22 are arranged at a head portion of the case body 20 and include an analog stick provided for tilting operation, a depression button, a trigger button for inputting a pull amount, and so forth.

The case body 20 has a grip part 21 and a curved part 23 that connects a case body head portion and a case body bottom portion to each other. The user passes the fingers from the forefinger to the little finger between the grip part 21 and the curved part 23 to grip the grip part 21. In the state in which the user grips the grip part 21, the user operates the operation members 22a, 22b, and 22c with the thumb and operates the operation member 22d with the forefinger. While the markers 30h, 30i, and 30j are provided on the grip part 21, they are arranged at positions at which they are not hidden by the hand even in the state in which the user grips the grip part 21. By providing one or more markers 30 on the grip part 21, estimation accuracy of the position and the posture can be increased.

Each marker 30 is a light emitting part that emits light to the outside of the case body 20 and includes a resin portion, on a surface of the case body 20, through which light from a light source such as an LED device is diffused and emitted to the outside. The markers 30 are imaged by the imaging devices 14 and utilized in a process of estimating the position and the posture of the inputting device 16. Since the imaging devices 14 image the inputting device 16 in a predetermined cycle (60 frames per second, for example), it is preferable that the markers 30 emit light in synchronism with periodical imaging timings of the imaging devices 14 while they are turned off during a non-exposure period by the imaging devices 14 to suppress useless power consumption.

Figure 5:
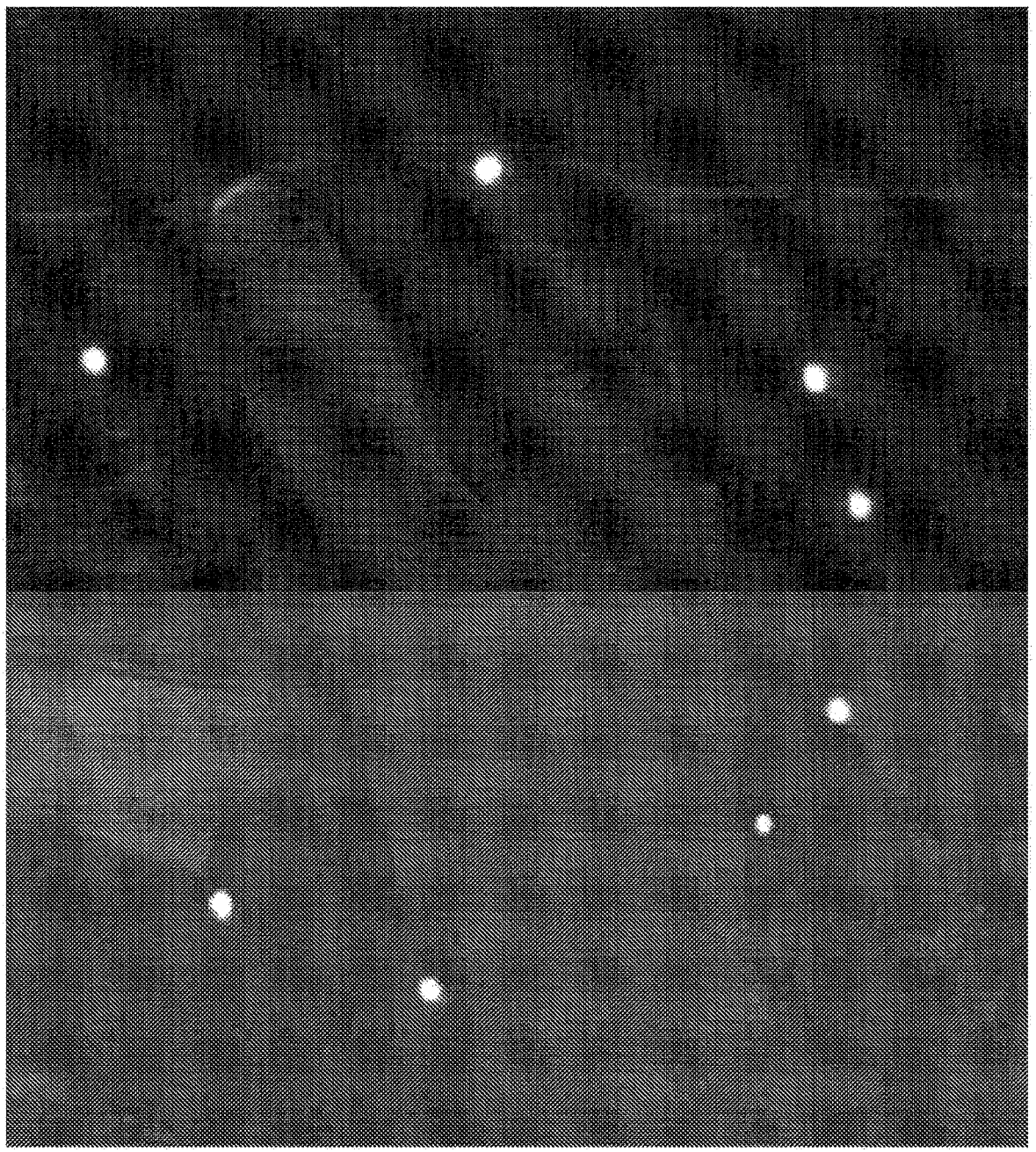
FIG. 5 is a view depicting an example of part of an image obtained by capturing the inputting device.

FIG. 5 depicts an example of part of an image obtained by capturing the inputting device 16. This image is a captured image of the inputting device 16 gripped by the right hand and includes images of the plurality of markers 30 that emit light. In the HMD 100, the communication controlling unit 128 transmits image data captured by the imaging devices 14 to the information processing apparatus 10 in a predetermined cycle.

Figure 6:
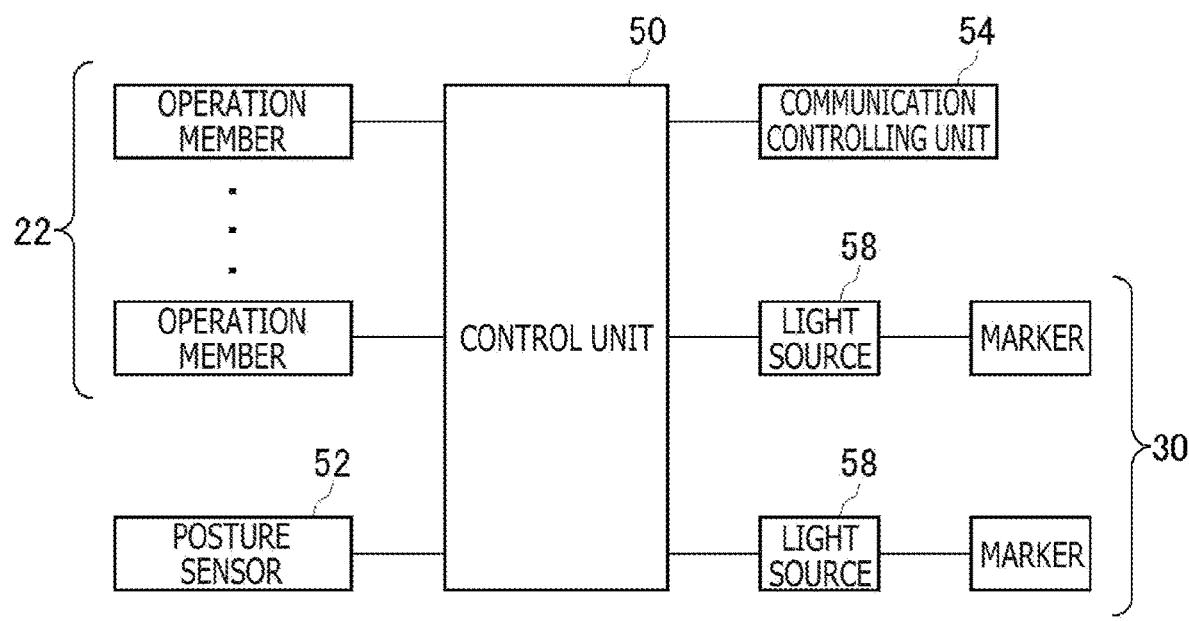
FIG. 6 is a view depicting functional blocks of the inputting device.

FIG. 6 depicts functional blocks of the inputting device 16. A control unit 50 accepts operation information inputted through the operation members 22 and accepts sensor data acquired by a posture sensor 52. The posture sensor 52 acquires sensor data relating to a movement of the inputting device 16. The posture sensor 52 includes at least a three-axis acceleration sensor and a three-axis gyro sensor. The posture sensor 52 detects values (sensor data) of individual axial components in a predetermined cycle (1600 Hz, for example). The control unit 50 supplies the operation information and sensor data thus accepted to a communication controlling unit 54. The communication controlling unit 54 transmits the operation information and the sensor data outputted from the control unit 50 to the information processing apparatus 10 by wired or wireless communication through a network adapter or an antenna. Further, the communication controlling unit 54 acquires a light emission instruction from the information processing apparatus 10.

The inputting device 16 includes a plurality of light sources 58 for turning on the plurality of markers 30. The light sources 58 may each be an LED device that emits light of a predetermined color. The control unit 50 controls the light sources 58 to emit light on the basis of the light emission instruction acquired from the information processing apparatus 10 to turn on the markers 30.

Figure 7:
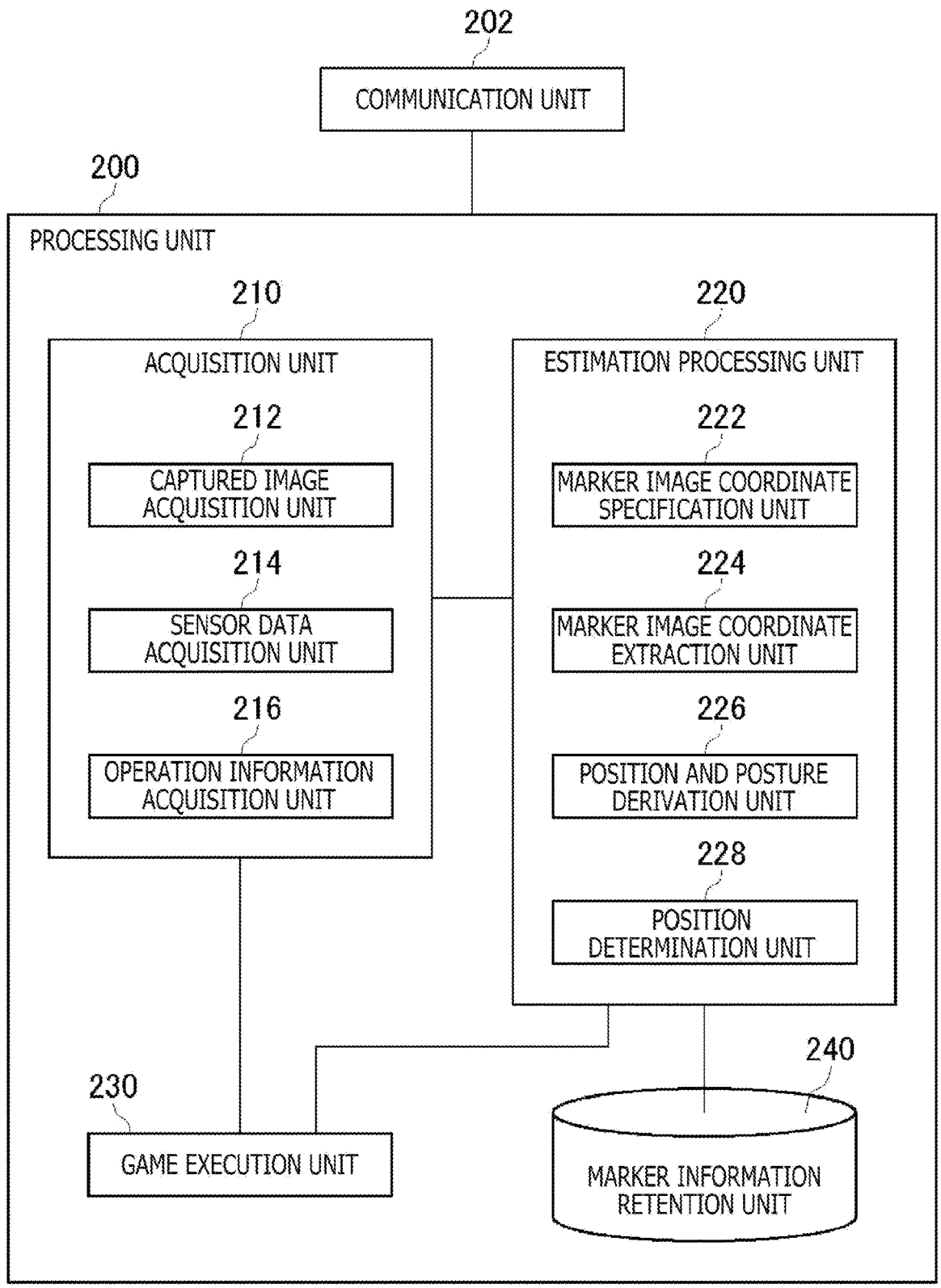
FIG. 7 is a view depicting functional blocks of an information processing apparatus.

FIG. 7 depicts functional blocks of the information processing apparatus 10. The information processing apparatus 10 includes a processing unit 200 and a communication unit 202. The processing unit 200 includes an acquisition unit 210, an estimation processing unit 220, a game execution unit 230, and a marker information retention unit 240. The communication unit 202 receives operation information and sensor data transmitted from the inputting device 16 and supplies the operation information and the sensor data to the acquisition unit 210. Further, the communication unit 202 receives captured image data and sensor data transmitted from the HMD 100 and supplies the captured image data and the sensor data to the acquisition unit 210.

The acquisition unit 210 includes a captured image acquisition unit 212, a sensor data acquisition unit 214, and an operation information acquisition unit 216. The estimation processing unit 220 includes a marker image coordinate specification unit 222, a marker image coordinate extraction unit 224, a position and posture derivation unit 226, and a position determination unit 228. The estimation processing unit 220 estimates position information and posture information of the inputting device 16 on the basis of coordinates of marker images in a captured image. The estimation processing unit 220 supplies the position information and the posture information of the inputting device 16 to the game execution unit 230.

These components can be implemented, in terms of hardware, by any processor, any memory, and other large scale integrated circuits (LSIs) and, in terms of software, by a program loaded in the memory and so forth. However, in FIG. 7, functional blocks implemented by cooperation of them are depicted. Accordingly, it can be recognized by those skilled in the art that the functional blocks can be implemented in various forms only by hardware, only by software, or by a combination of them.

The captured image acquisition unit 212 acquires a captured image of the inputting device 16 including the plurality of markers 30 and supplies the image to the estimation processing unit 220. The sensor data acquisition unit 214 acquires sensor data transmitted from the inputting device 16 and the HMD 100 and supplies the sensor data to the estimation processing unit 220. The operation information acquisition unit 216 acquires operation information transmitted from the inputting device 16 and supplies the operation information to the game execution unit 230. The game execution unit 230 proceeds with the game on the basis of the operation information and the position and posture information of the inputting device 16.

The marker image coordinate specification unit 222 specifies a two-dimensional coordinate (hereinafter referred to also as a "marker image coordinate") that represents an image of each marker 30 included in a captured image. The marker image coordinate specification unit 222 may specify a region of pixels having a luminance value equal to or higher than a predetermined value and calculate a gravity center coordinate of the pixel region to set the calculated coordinate as a marker image coordinate. At this time, the marker image coordinate specification unit 222 preferably ignores a pixel region having a shape and a size that may be impossible as a marker image and calculates a gravity center coordinate of a pixel region having a shape and a size that may be estimated as a marker image.

As a technique for estimating, from a captured image of an object having a known three-dimensional shape and size, a position and a posture of an imaging device by which the captured image has been imaged, a method of solving a perspective n-point (PNP) problem is known. In the embodiment, the marker image coordinate extraction unit 224 extracts N (an integer equal to or greater than 3) two-dimensional marker image coordinates in the captured image. Then, the position and posture derivation unit 226 derives position information and posture information of the inputting device 16 from the N marker image coordinates extracted by the marker image coordinate extraction unit 224 and three-dimensional coordinates of N markers in a three-dimensional model of the inputting device 16. The position and posture derivation unit 226 estimates a position and a posture of the imaging devices 14 by using expression 1 given below and derives position information and posture information in the three-dimensional space of the inputting device 16 on the basis of a result of the estimation.

[Math. 1]

$$S \begin{bmatrix} u \\ v \\ 1 \end{bmatrix} = \begin{bmatrix} f_x & 0 & 0 \\ 0 & f_y & 0 \\ 0 & 0 & 1 \end{bmatrix} \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix} \begin{bmatrix} X \\ Y \\ Z \\ 1 \end{bmatrix} \quad \text{(expression 1)}$$

Here, $(u, v)$ is a marker image coordinate in the captured image, and $(X, Y, Z)$ is a position coordinate in the three-dimensional space of the marker 30 obtained when the three-dimensional model of the inputting device 16 is in a reference position and a reference posture. It is to be noted that the three-dimensional model is a model that has a shape and a size completely same as those of the inputting device 16 and has markers arranged at respective same positions. The marker information retention unit 240 retains three-dimensional coordinates of the markers in the three-dimensional model that is in the reference position and the reference posture. The position and posture derivation unit 226 reads out the three-dimensional coordinates of the markers from the marker information retention unit 240 to acquire $(X, Y, Z)$.

$(f_x, f_y)$ is a focal distance of the imaging device 14 and $(c_x, c_y)$ is an image principal point, and both of them are internal parameters of the imaging device 14. A matrix whose elements are $r_{11}$ to $r_{33}$ and $t_1$ to $t_3$ is a rotation and translation matrix. In the expression 1 above, $(u, v)$, $(f_x, f_y)$, $(c_x, c_y)$, and $(X, Y, Z)$ are known, and the position and posture derivation unit 226 solves the equation for the N markers 30 to obtain a rotation and translation matrix common to them. The position and posture derivation unit 226 derives position information and posture information of the inputting device 16 on the basis of an angle and a translation amount represented by the matrix. In the embodiment, the process of estimating the position and posture of the inputting device 16 is performed by solving a P3P problem. Accordingly, the position and posture derivation unit 226 derives the position and the posture of the inputting device 16 by using three marker image coordinates and three three-dimensional marker coordinates of the three-dimensional model of the inputting device 16.

In the information processing system 1 of the embodiment, the user grips the inputting devices 16 with both hands to play a game. Therefore, a captured image in this case includes images of markers 30 of the inputting device 16 gripped with the right hand of the user and images of markers 30 of the inputting device 16 gripped with the left hand of the user.

Figure 8:
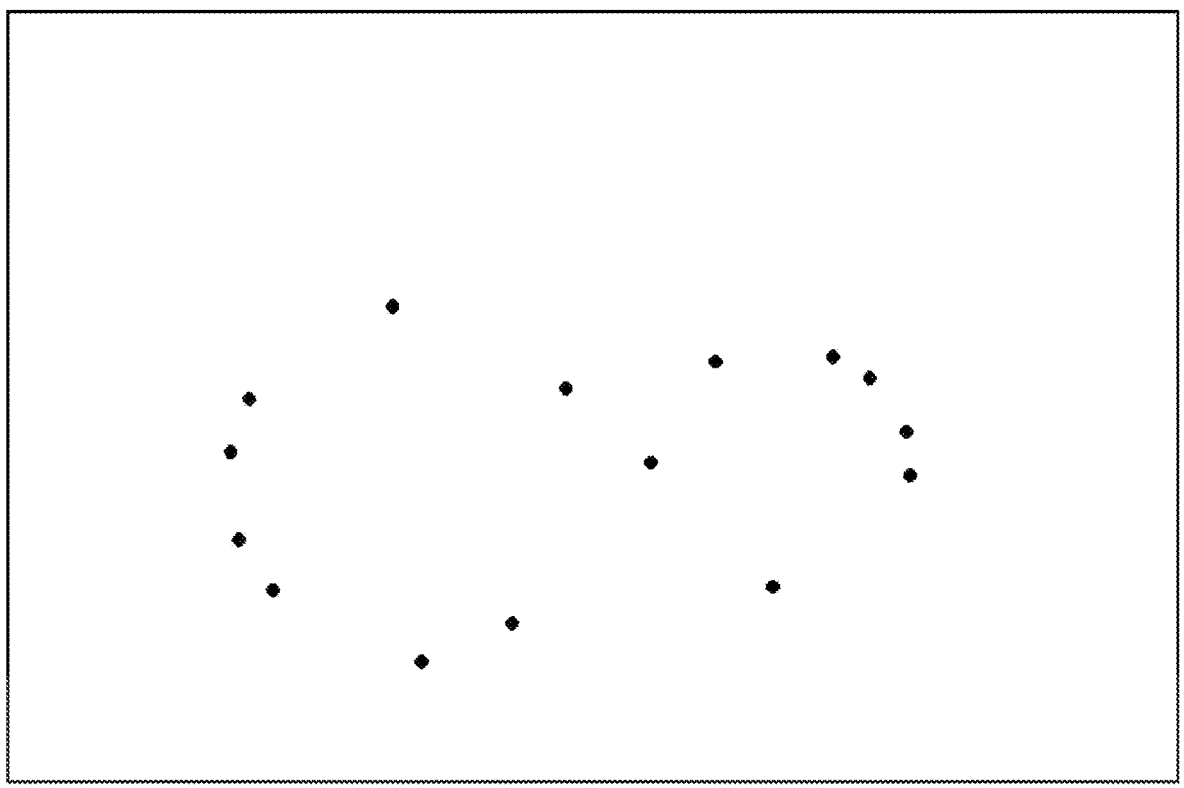
FIG. 8 is a view depicting an example of an image obtained by capturing two inputting devices.

FIG. 8 depicts an example of an image obtained by capturing the two inputting devices 16. The captured image includes images of the markers 30 of the inputting device 16 gripped with the right hand and images of the markers 30 of the inputting device 16 gripped with the left hand. It is to be noted that, for the convenience of illustration, a black-and-white-inverted captured image is depicted and marker images are each represented by a black region in FIG. 8. In the following description, the inputting device 16 gripped with the right hand is referred to as an "inputting device 16a" and the inputting device 16 gripped with the left hand is referred to as an "inputting device 16b."

Figure 9:
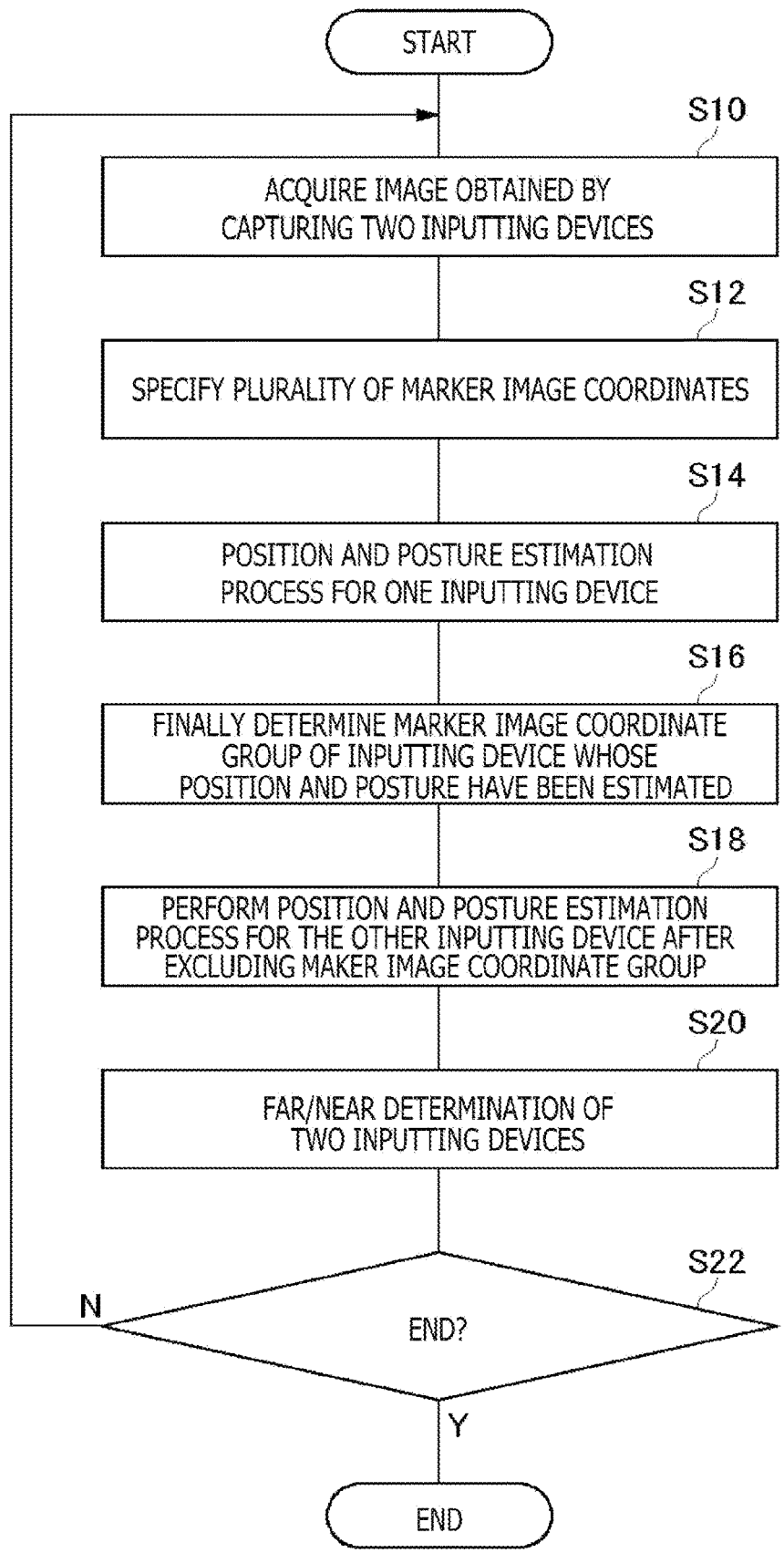
FIG. 9 is a flow chart of an estimation process performed by an estimation processing unit.

FIG. 9 is a flow chart of an estimation process performed by the estimation processing unit 220. When the captured image acquisition unit 212 acquires an image obtained by capturing the two inputting devices 16a and 16b (S10), the marker image coordinate specification unit 222 specifies coordinates of a plurality of marker images included in the captured image (S12). The specified plurality of marker image coordinates include both those that represent marker positions of the inputting device 16a and those that represent marker positions of the inputting device 16b.

Figure 10:
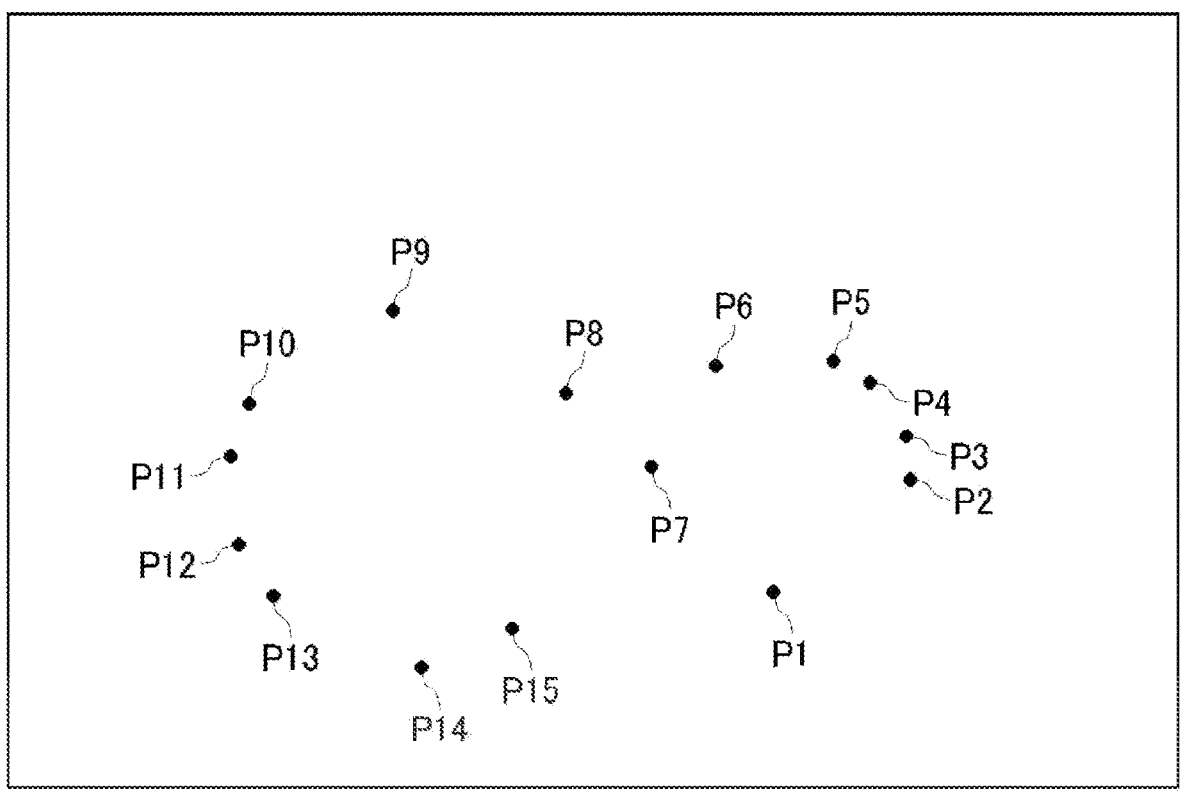
FIG. 10 is a view depicting a state in which coordinates of a plurality of marker images are specified.

FIG. 10 depicts a state in which the marker image coordinate specification unit 222 specifies coordinates of a plurality of marker images included in a captured image. In this example, the marker image coordinate specification unit 222 specifies marker image coordinates P1 to P15.

The estimation processing unit 220 estimates position information and posture information of one of the inputting device 16a and the inputting device 16b first, and then estimates position information and posture information of the other one of them. Upon initial tracking, the estimation processing unit 220 may carry out a position and posture estimation process for the inputting device 16a for the right hand first (S14). The marker image coordinate extraction unit 224 extracts three random marker image coordinates from the marker image coordinates P1 to P15.

The marker information retention unit 240 retains three-dimensional coordinates of the markers in the three-dimensional models of the right-hand inputting device 16a and the left-hand inputting device 16b that are at a reference position and in a reference posture. The position and posture derivation unit 226 reads out the three-dimensional coordinates of the markers in the three-dimensional model of the inputting device 16a for the right hand from the marker information retention unit 240 and solves the P3P problem by using the expression 1. When the position and posture derivation unit 226 specifies a rotation and translation matrix common to the three extracted marker image coordinates, it can specify the marker image coordinates of the inputting device 16a other than the three extracted marker image coordinates. The position and posture derivation unit 226 calculates a re-projection error by using the marker image coordinates other than the three extracted marker image coordinates.

At S14, the marker image coordinate extraction unit 224 extracts a predetermined number of combinations of three marker image coordinates from the marker image coordinates P1 to P15, and the position and posture derivation unit 226 specifies a rotation and translation matrix for each combination of the three extracted marker image coordinates to calculate a re-projection error of each matrix. Thereafter, the position and posture derivation unit 226 specifies a rotation and translation matrix having a minimum re-projection error from the predetermined number of re-projection errors and derives position information and posture information of the inputting device 16a.

By the specification of the rotation and translation matrix by the position and posture derivation unit 226, a marker image coordinate group of the inputting device 16a is finally determined (S16). In the example depicted in FIG. 10, the marker image coordinate group of the inputting device 16a includes the marker image coordinates P1 to P7. The position and posture derivation unit 226 derives position information and posture information of the inputting device 16a and then derives position information and posture information of the inputting device 16b on the basis of the remaining marker image coordinates P8 to P15 excluding the marker image coordinates P1 to P7 of the inputting device 16a.

After the position and posture estimation process for the inputting device 16a for the right hand is completed, the estimation processing unit 220 performs a position and posture estimation process for the inputting device 16b for the left hand (S18). The marker image coordinate extraction unit 224 extracts three random marker image coordinates from the remaining marker image coordinates P8 to P15 excluding the marker image coordinates P1 to P7 of the inputting device 16a. The position and posture derivation unit 226 reads out the three-dimensional coordinates of the markers in the three-dimensional model of the inputting device 16b for the left hand from the marker information retention unit 240 and solves the P3P problem by using the expression 1. When the position and posture derivation unit 226 specifies a rotation and translation matrix common to the three extracted marker image coordinates, it can specify marker image coordinates of the inputting device 16b other than the three extracted marker image coordinates. The position and posture derivation unit 226 calculates a re-projection error by using the marker image coordinates other than the three extracted marker image coordinates. It is to be noted that, upon calculation of the re-projection error, the position and posture derivation unit 226 does not use the marker image coordinates P1 to P7.

At S18, the marker image coordinate extraction unit 224 extracts a predetermined number of combinations of three marker image coordinates from the marker image coordinates P8 to P15, and the position and posture derivation unit 226 specifies a rotation and translation matrix for each combination of the three extracted marker image coordinates to calculate a re-projection error of each matrix. Thereafter, the position and posture derivation unit 226 specifies a rotation and translation matrix having a minimum re-projection error from the predetermined number of re-projection errors and derives position information and posture information of the inputting device 16b. The estimation processing unit 220 supplies the position information and the posture information of the inputting device 16a and the inputting device 16b to the game execution unit 230.

At S18, in this manner, the position and posture derivation unit 226 derives the position information and the posture information of the inputting device 16b after excluding the marker image coordinates P1 to P7 from candidates. Therefore, the calculation amount can be reduced.

After the position and posture derivation unit 226 estimates the position information and the posture information of the inputting device 16a and the inputting device 16b, the position determination unit 228 determines which one of the inputting device 16a and the inputting device 16b is nearer to the imaging device 14 (S20). In this example, the position determination unit 228 determines that the inputting device 16b for the left hand is nearer to the imaging device 14 than the inputting device 16a for the right hand.

The position and posture estimation process is carried out in an imaging cycle of captured images (N at S22). After the position information and the posture information of the inputting device 16a and the inputting device 16b are derived, when the captured image acquisition unit 212 acquires a new captured image (S10), the estimation processing unit 220 derives the position information and the posture information of the inputting device 16b that is located relatively near to the imaging device 14 before deriving the position information and the posture information of the inputting device 16a that is located relatively far from the imaging device 14. In short, at S14, the estimation processing unit 220 derives the position information and the posture information of the inputting device 16b, which has been determined to be located relatively near to the imaging device 14 on the basis of the result of the estimation process using the previous captured image, before deriving those of the inputting device 16a.

The inputting device 16a located relatively far from the imaging device 14 may be hidden, as viewed from the imaging device 14, by the inputting device 16b located relatively near to the imaging device 14 in some cases, but the reverse situation does not occur. Therefore, it is expected that the position information and the posture information of the inputting device 16b are estimated with high accuracy, and the estimation processing unit 220 carries out the process of estimating the position information and the posture information of the inputting device 16b located nearer to the imaging device 14 before carrying out the estimation process for the inputting device 16a.

After the position and posture estimation process for the inputting device 16b for the left hand is completed, the estimation processing unit 220 carries out the position and posture estimation process for the inputting device 16a for the right hand (S18). The marker image coordinate extraction unit 224 extracts three random marker image coordinates from the remaining marker image coordinates P1 to P7 excluding the marker image coordinates P8 to P15 of the inputting device 16b. The position and posture derivation unit 226 reads out the three-dimensional coordinates of the markers in the three-dimensional model of the inputting device 16a for the right hand from the marker information retention unit 240 and solves the P3P problem by using the expression 1, to thereby derive position information and posture information of the inputting device 16a. When the game execution unit 230 ends the game, the position and posture estimation process by the estimation processing unit 220 is also ended (Y at S22).

The present invention has been described on the basis of the embodiment. The embodiment described above is exemplary, and it is understood by those skilled in the art that various modifications are possible in regard to combinations of the components and the processes and that such modifications also fall within the scope of the present invention. While, in the embodiment, the estimation process is carried out by the information processing apparatus 10, the function of the information processing apparatus 10 may be provided in the HMD 100 such that the HMD 100 carries out the estimation process.

While the embodiment described above is directed to the arrangement of the plurality of markers 30 on the inputting devices 16 that include the operation members 22, a device as a target of tracking may not necessarily include any operation member 22. While the embodiment described above is directed to the position and posture estimation process in the case where the two inputting devices 16 are imaged, also a position and posture estimation process in a case where three or more devices as tracking targets are imaged is implemented similarly. Further, while the imaging devices 14 are attached to the HMD 100 in the embodiment, it is sufficient if the imaging devices 14 can capture marker images, and the imaging devices 14 may be attached to different positions other than the HMD 100.

INDUSTRIAL APPLICABILITY

The present invention can be utilized in a technical field in which position information and posture information of a device are derived.

REFERENCE SIGNS LIST

1: Information processing system
10: Information processing apparatus
14: Imaging device
16: Inputting device
30: Marker
200: Processing unit
202: Communication unit
210: Acquisition unit
212: Captured image acquisition unit
214: Sensor data acquisition unit
216: Operation information acquisition unit
220: Estimation processing unit
222: Marker image coordinate specification unit
224: Marker image coordinate extraction unit
226: Position and posture derivation unit
228: Position determination unit
230: Game execution unit
240: Marker information retention unit

The invention claimed is:

1. An information processing apparatus comprising:
a captured image acquisition unit configured to acquire an image obtained by capturing a first device that includes a first plurality of markers and a second device that includes a second plurality of markers, where the first device and the second device are attached to, and move with, a user in a real space, and where the first plurality of markers and the second plurality of markers are light emitting parts; and
an estimation processing unit configured to estimate position information and posture information of the first device and position information and posture information of the second device on a basis of marker image coordinates in the captured image produced by the first plurality of markers and the second plurality of markers, wherein
the estimation processing unit initially derives the position information and the posture information of the first device from the marker image coordinates in the captured image produced by all of the first plurality of markers, and then derives the position information and the posture information of the second device on a basis of remaining marker image coordinates from the marker image coordinates in the captured image excluding the marker image coordinates in the captured image produced by all of the first plurality of markers of the first device.

2. The information processing apparatus according to claim 1, wherein the estimation processing unit derives the position information and the posture information of the first device located relatively near to an imaging device before deriving the position information and the posture information of the second device located relatively far from the imaging device.

3. The information processing apparatus according to claim 2, wherein the estimation processing unit derives the position information and the posture information of the first device that has been determined to be located relatively near to the imaging device on a basis of a result of an estimation process using a previous captured image, before deriving the position information and the posture information of the second device.

4. The information processing apparatus according to claim 1, wherein the estimation processing unit includes an extraction unit configured to extract N marker image coordinates in the captured image, N being an integer equal to or greater than 3, and a position and posture derivation unit configured to derive the position information and the posture information of the first device by using the extracted N marker image coordinates, after the position and posture derivation unit derives the position information and the posture information of the first device, the extraction unit extracts N marker image coordinates from the remaining marker image coordinates excluding the marker image coordinates of the first device, and the position and posture derivation unit derives the position information and the posture information of the second device by using the N marker image coordinates extracted from the remaining marker image coordinates.

5. A device information derivation method comprising:

acquiring an image obtained by capturing a first device that includes a first plurality of markers and a second device that includes a second plurality of markers, where the first device and the second device are attached to, and move with, a user in a real space, and where the first plurality of markers and the second plurality of markers are light emitting parts; and estimating position information and posture information of the first device and position information and posture information of the second device on a basis of marker image coordinates in the captured image produced by the first plurality of markers and the second plurality of markers, wherein, the estimating includes initially deriving the position information and the posture information of the first device from the marker image coordinates in the captured image produced by all of the first plurality of markers, and then deriving the position information and the posture information of the second device on a basis of remaining marker image coordinates from the marker image coordinates in the captured image excluding the marker image coordinates in the captured image produced by all of the first plurality of markers of the first device.

6. A non-transitory, computer readable storage medium containing a computer program, which when executed by a computer, causes the computer to perform a device information derivation method by carrying out actions, comprising:

acquiring an image obtained by capturing a first device that includes a first plurality of markers and a second device that includes a second plurality of markers, where the first device and the second device are attached to, and move with, a user in a real space, and where the first plurality of markers and the second plurality of markers are light emitting parts; and estimating position information and posture information of the first device and position information and posture information of the second device on a basis of marker image coordinates in the captured image produced by the first plurality of markers and the second plurality of markers, wherein, the estimating includes initially deriving the position information and the posture information of the first device from the marker image coordinates in the captured image produced by all of the first plurality of markers, and then deriving the position information and the posture information of the second device on a basis of remaining marker image coordinates from the marker image coordinates in the captured image excluding the marker image coordinates in the captured image produced by all of the first plurality of markers of the first device.

* * * * *